United States Patent [19]
Love et al.

[11] Patent Number: 5,771,461
[45] Date of Patent: Jun. 23, 1998

[54] METHOD AND APPARATUS FOR POWER CONTROL OF A FIRST CHANNEL BASED ON A SIGNAL QUALITY OF A SECOND CHANNEL

[75] Inventors: Robert T. Love, Barrington; Barry J. Menich, Schaumburg, both of Ill.

[73] Assignee: Motorola, Inc., Schaumburg, Ill.

[21] Appl. No.: 672,703

[22] Filed: Jun. 28, 1996

[51] Int. Cl.[6] .................................................. H04B 1/00
[52] U.S. Cl. ............................ 455/522; 455/422; 455/69
[58] Field of Search ................................ 455/33.1, 54.1, 455/54.2, 56.1, 63, 68, 69, 67.3, 422, 441, 522, 524; 379/59; 370/328, 335

[56] References Cited

U.S. PATENT DOCUMENTS

| | | | |
|---|---|---|---|
| 5,455,964 | 10/1995 | Roos et al. | 455/69 |
| 5,487,180 | 1/1996 | Ohtake | 455/54.1 |
| 5,497,505 | 3/1996 | Koohgoli et al. | 455/54.1 |
| 5,574,983 | 11/1996 | Douzono et al. | 455/522 |
| 5,590,409 | 12/1996 | Sawnhaski et al. | 455/552 |

*Primary Examiner*—Edward F. Urban
*Attorney, Agent, or Firm*—Kenneth A. Haas

[57] ABSTRACT

Power control in a spread-spectrum communication system takes place by determining origination power of a traffic channel based on a number of active demodulators and pilot channel signal quality (610). Once origination transmit power is determined and call origination takes place, the transmit power is reduced at a first rate when a time is less than a time for all active demodulators to be established (615), otherwise the transmit power is reduced at a second rate (621). After all active demodulators have been acquired power control takes place by receiving a Power Measurement Report Message (PMRM) or a Pilot Strength Measurement Message (PSMM), determining, a signal quality metric existing at the remote unit based on the PMRM or PSMM, and adjusting transmit power based on the signal quality metric (645).

15 Claims, 8 Drawing Sheets

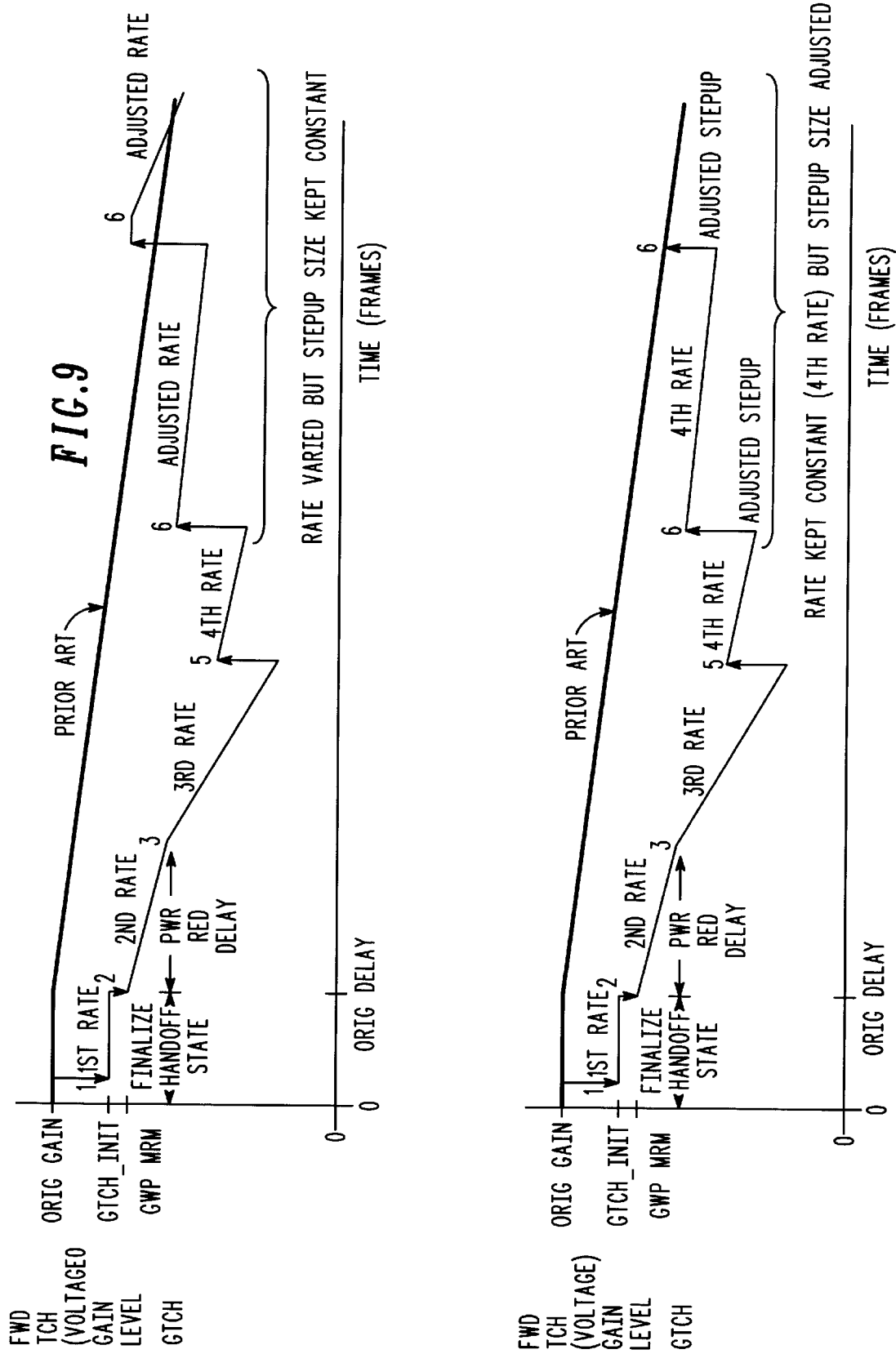

METHOD AND APPARATUS FOR POWER CONTROL OF A FIRST CHANNEL BASED ON A SIGNAL QUALITY OF A SECOND CHANNEL

FIELD OF THE INVENTION

The present invention relates generally to spread-spectrum communication systems and, in particular, to power control in a spread-spectrum communication system.

BACKGROUND OF THE INVENTION

Communication systems are known to employ power control methods that control forward-link transmission energy. Once such communication system employing forward-link power control is a spread-spectrum communication system. Because many forward-link signals in a spread-spectrum system are typically transmitted on the same frequency, a majority of the noise (which is inversely proportional to bit energy per noise+interference density i.e., $E_b/N_o$) associated with a received signal can be attributed to other forward-link transmissions. The magnitude of this noise is directly related to the received signal power of each of the other forward-link transmissions. Thus it is beneficial for cellular infrastructure equipment (such as a cellular base station) to transmit with a forward-link gain at the lowest level possible that insures acceptable transmission quality.

The current method of controlling forward-link power in a code-division, multiple-access (CDMA) communication system is described in Cellular System Remote unit-Base Station Compatibility Standard of the Electronic Industry A36,283 Association Interim Standard 95 (TIA/EIA/IS-95-A). (EIA/TIA can be contacted at 2001 Pennsylvania Ave. NW Washington D.C. 20006). During TIA/EIA/IS-95-A call origination, initial forward-link gain must be set high enough to guarantee an acceptable link. Since the channel between the base station and the remote unit is unknown at the time of origination, the call is originated at a maximum forward-link gain and then powered down accordingly. Because TIA/EIA/IS-95-A forward-link power control is very slow to update (on the order of once every four seconds), the base station can transmit at an unacceptably high forward-link gain for extended periods of time, needlessly contributing to system noise.

Thus a need exists for a method and apparatus for power control in a spread-spectrum communication system that reduces the time a base station transmits at an unacceptably high forward-link gain.

BRIEF DESCRIPTION OF THE DRAWINGS

FIGS. 9A and 9B illustrate a time-domain diagram of forward-link power in accordance with a preferred embodiment of the invention.

DESCRIPTION OF A PREFERRED EMBODIMENT

Figure 1:
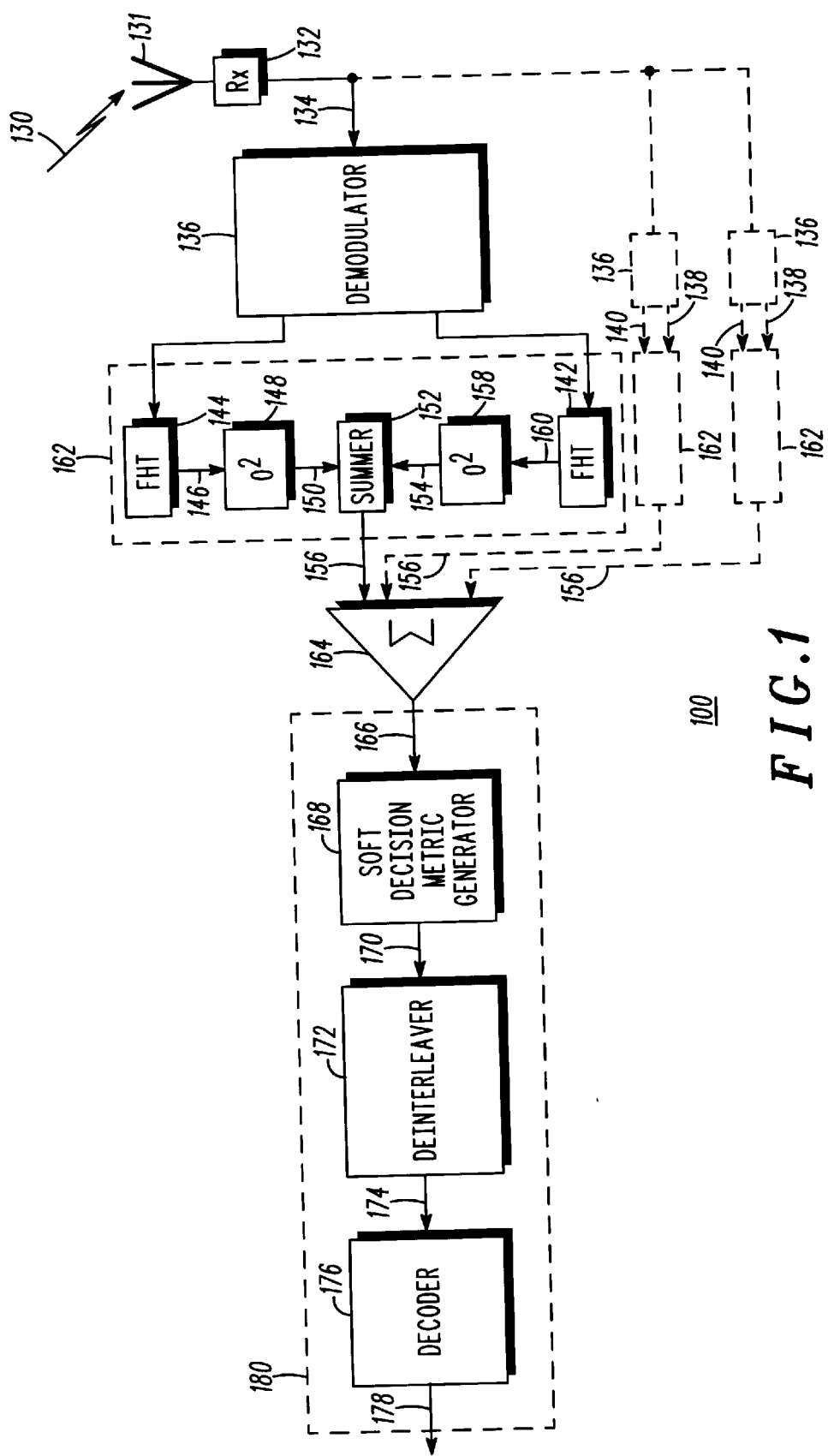
FIG. 1 is a block diagram of a preferred embodiment of a base station receiver that can utilize the present invention.

The present invention addresses the above-mentioned problem by determining origination power of a traffic channel based on a number of active demodulators and pilot channel signal quality. Once origination transmit power is determined and call origination takes place, the transmit power is reduced at a first rate when a time is less than a time for all active demodulators to be established, otherwise the transmit power is reduced at a second rate. After all active demodulators have been acquired power control takes place by receiving a Power Measurement Report Message (PMRM) or a Pilot Strength Measurement Message (PSMM), determining, a signal quality metric existing at the remote unit based on the PMRM or PSMM, and adjusting transmit power based on the signal quality metric.

Generally, the present invention encompasses a method for power control in a communication system by communicating, via a first base station, to a remote unit on a first channel at a first power level. Next, a determination of a signal quality metric of the first channel is made, and finally a call is originated via the first base station on a second channel at a second power level based on the signal quality metric.

Another aspect of the present invention encompasses a method of power control in a communication system comprising the steps of transmitting on a first channel, at a first power level, the first power level based on a number of active demodulators, and reducing the first power level at a first rate when a time is less than a time for all active demodulators to be established, otherwise reducing the first power level at a second rate.

Another aspect of the present invention encompasses a method of power control in a communication system comprising the steps of transmitting from cellular infrastructure equipment to a remote unit at a first power level and receiving, by the cellular infrastructure equipment, a Power Measurement Report Message (PMRM) or a Pilot Strength Measurement Message (PSMM). Next, a determination of signal quality existing at the remote unit is made based on the PMRM or PSMM. Finally the transmission from the remote unit is broadcast at a second power level based on the signal quality.

Another aspect of the present invention encompasses an apparatus for power control in a communication system, the apparatus comprising cellular infrastructure equipment communicating, via a first base station, to a remote unit on a first channel at a first power level, and an instantaneous traffic channel gain estimation computer (ITC) coupled to the cellular infrastructure equipment, the ITC determining a signal quality metric of the first channel and originating a call, via the first base station, on a second channel at a second power level based on the signal quality metric.

Another aspect of the present invention encompasses an apparatus for power control in a communication system, the apparatus comprising cellular infrastructure equipment transmitting on a first channel, at a first power level, the first power level based on a number of active demodulators, and an initial forward power control computer (IFC) coupled to the cellular infrastructure equipment, the IFC reducing the first power level at a first rate when a time is less than a time for all active demodulators to be established, otherwise reducing the power level at a second rate.

Another aspect of the present invention encompasses an apparatus for power control in a communication system, the apparatus comprising cellular infrastructure equipment transmitting to a remote unit at a first power level, the cellular infrastructure equipment receiving a Power Measurement Report Message (PMRM) or a Pilot Strength Measurement Message (PSMM). The apparatus additionally comprises a post-initial forward power control computer (PFC) coupled to the cellular infrastructure equipment, the PFC determining a signal quality metric existing at the remote unit wherein the signal quality metric is based on the received message and transmitting to the remote unit at a second power level based on the determination.

FIG. 1 is a block diagram of a preferred embodiment of a base station receiver 100 for receiving a signal transmitted by a remote unit. Orthogonally encoded spread-spectrum digital signal 130 is received at receive antenna 131 and amplified by receiver 132 before being despread and demodulated 136 into in-phase 140 and quadrature 138 components. Components 138, 140 of despread digital samples are then grouped into predetermined length groups (e.g., 64 sample length groups) of sampled signals that are independently input to orthogonal decoders in the form of fast Hadamard transformers 142, 144, which despread the orthogonally encoded signal components producing a plurality of despread signal components 146 and 160, respectively (e.g. when 64 sample length groups are input, then 64 despread signals are generated). In addition, each transformer output signal 146, 160 has an associated Walsh index symbol which identifies each particular orthogonal code from within a set of mutually orthogonal codes (e.g. when 64 sample length groups are input, then a 6 bit length index data symbol can be associated with the transformer output signal to indicate the particular 64 bit length orthogonal code to which the transformer output signal corresponds). The energy values with the same Walsh index in each group of resulting signal 156 from each branch of receiver 100 will then be summed at summer 164 to provide a group of summed energy values 166. The energy value with index i in the group of summed energy values 166 corresponds to a measure of confidence that the group of sampled signals, which generate this group of summed energy values 166, corresponds to the i-th Walsh symbol. The group of summed energy values with associated indices will then be sent to a soft decision metric generator 168 where a single metric for each encoded data bit is determined, thereby producing a single set of aggregate soft decision data 170. The aggregate soft decision data 170 is then deinterleaved by deinterleaver 172 prior to final maximum likelihood decoding by decoder 176.

Figure 2:
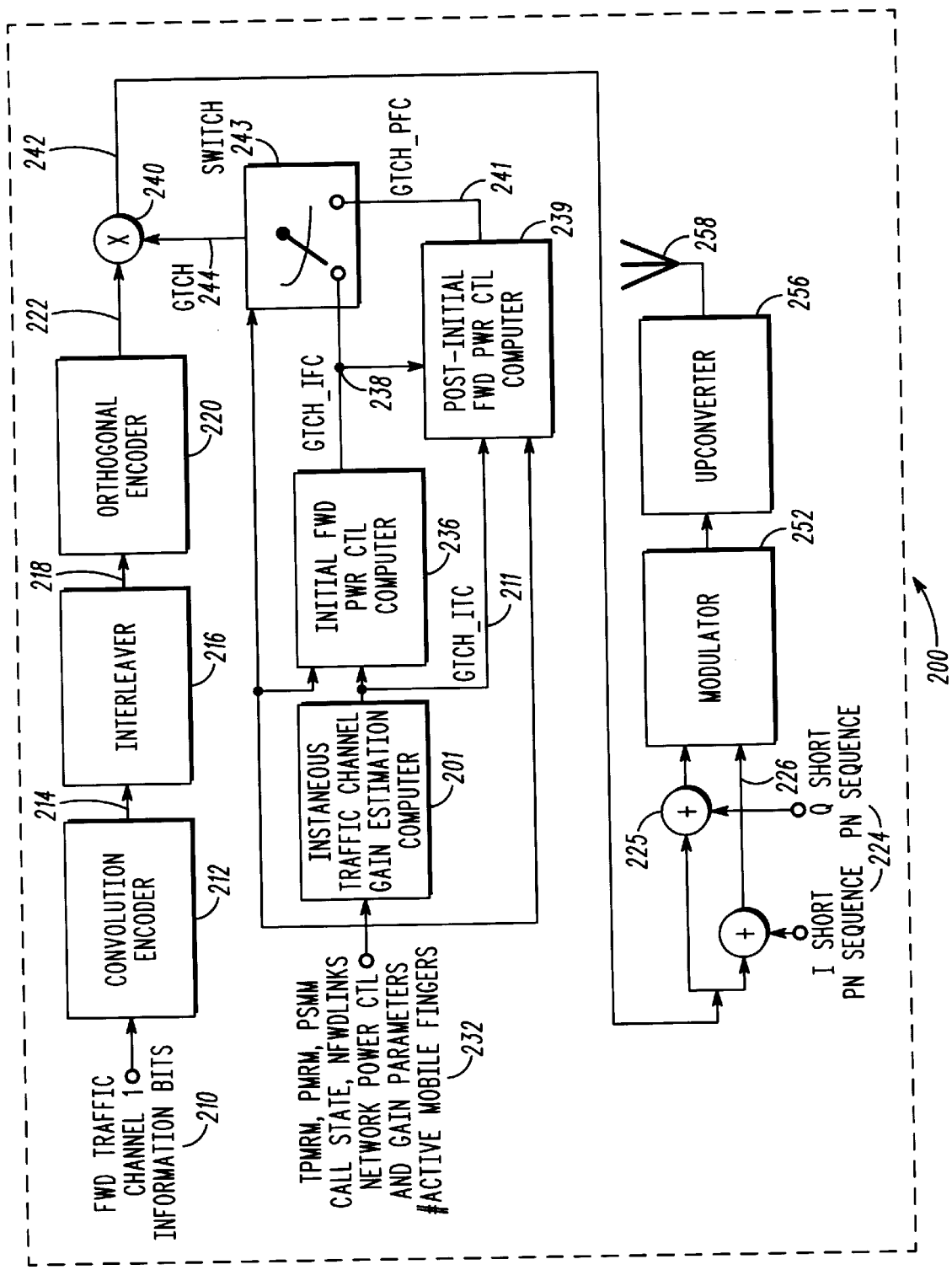
FIG. 2 is a block diagram of a base station transmitter in accordance with a preferred embodiment of the present invention.

FIG. 2 is a block diagram of a preferred embodiment of a CDMA transmitter 200 for transmitting a signal to a remote unit over a single channel. Transmitter 200 includes convolutional encoder 212, interleaver 216, orthogonal encoder 220, modulator 252, upconverter 256, instantaneous traffic channel gain estimation computer (ITC) 201, post-initial forward power control computer (PFC) 239, initial forward power control computer (IFC) 236, switch 243, and antenna 258. Although transmitter 200 is shown communicating on one forward channel, one or ordinary skill in the art will recognize that typical CDMA base stations comprise multiple transmitters 200 for transmitting on multiple traffic channels simultaneously.

During operation, signal 210 (traffic channel data bits) is received by convolutional encoder 212 at a particular bit rate (e.g., 9.6 kbit/second). Input traffic channel data 210 bits typically include voice converted to data by a vocoder, pure data, or a combination of the two types of data. Convolutional encoder 212 encodes input data bits 210 into data symbols at a fixed encoding rate with an encoding algorithm which facilitates subsequent maximum likelihood decoding of the data symbols into data bits (e.g. convolutional or block coding algorithms). For example, convolutional encoder 212 encodes input data bits 210 (received at a rate of 9.6 kbit/second) at a fixed encoding rate of one data bit to two data symbols (i.e., rate 1/2) such that convolutional encoder 212 outputs data symbols 214 at a 19.2 ksymbol/second rate.

Data symbols 214 are then input into interleaver 216. Interleaver 216 interleaves the input data symbols 214 at the symbol level. In interleaver 216, data symbols 214 are individually input into a matrix which defines a predetermined size block of data symbols 214. Data symbols 214 are input into locations within a matrix so that the matrix is filled in a column by column manner. Data symbols 214 are individually output from locations within the matrix so that the matrix is emptied in a row by row manner. Typically, the matrix is a square matrix having a number of rows equal to the number of columns; however, other matrix forms can be chosen to increase the output interleaving distance between the consecutively input non-interleaved data symbols. Interleaved data symbols 218 are output by interleaver 216 at the same data symbol rate that they were input (e.g., 19.2 ksymbol/second). The predetermined size of the block of data symbols defined by the matrix is derived from the maximum number of data symbols which can be transmitted at a predetermined symbol rate within a predetermined length transmission block. For example, if the predetermined length of the transmission block is 20 milliseconds, then the predetermined size of the block of data symbols is 19.2 ksymbol/second times 20 milliseconds which equals 384 data symbols which defines a 16 by 24 matrix.

Interleaved data symbols 218 are input to orthogonal encoder 220. Orthogonal encoder 220 modulo 2 adds an orthogonal code (e.g., a 64-ary Walsh code) to each interleaved and scrambled data symbol 218. For example, in 64-ary orthogonal encoding, interleaved and scrambled data symbols 218 are each replaced by a 64 symbol orthogonal code or its inverse. These 64 orthogonal codes preferably correspond to Walsh codes from a 64 by 64 Hadamard matrix wherein a Walsh code is a single row or column of the matrix. Orthogonal encoder 220 repetitively outputs a Walsh code or its inverse 222 which corresponds to input data symbol 218 at a fixed symbol rate (e.g., 19.2 ksymbol/second).

IFC 236 and PFC 239 update traffic channel gain values Gtch_IFC 238 and Gtch_PFC 241 respectively to minimize forward link interference while preserving adequate voice channel quality. In a preferred embodiment instantaneous traffic channel gain estimate computer (ITC) 201 computes instantaneous traffic channel gain estimate (Gtch_ITC) 211 as a function of a signal quality metric (e.g. pilot channel Ec/Io) and remote unit speed. Origination traffic channel gain value (Gtch_IFC) 238 is determined by IFC 236, and is a function of forward link quality measurements (e.g. TCH frame quality and frame quality history) performed by the remote unit along with Gtch_ITC 211.

Additionally PFC 239 determines post-initial (post remote unit call origination/termination) forward traffic channel gain value (Gtch_PFC) 241 based on forward link quality measurements performed by the remote unit and Gtch_ITC 211.

Switch 243 selects the appropriate traffic channel gain value Gtch_IFC 238 or Gtch_PFC 241 (depending on the call state) resulting in a selected traffic channel gain value (Gtch) 244. Switch 243 chooses Gtch_IFC 238 at the start of a remote unit call until a stable handoff state has been achieved subsequently it chooses Gtch_PFC 241. Gtch 244 is then output to multiplier 240, which multiplies Walsh code's 222 amplitude by gain value Gtch 244 resulting in a sequence of weighted Walsh codes 242. Sequence of weighted Walsh codes 242 is prepared for transmission over a communication channel by modulator 252. The spreading code is a user specific sequence of symbols or unique user code which is output at a fixed chip rate (e.g., 1.228 Mchip/second). In addition, the user code spread encoded chips are scrambled by a pair of short pseudorandom codes 224 (i.e. short when compared to the long code) to generate an I-channel and Q-channel code spread sequence 226. The I-channel and Q-channel code spread sequences 226 are used to bi-phase modulate a quadrature pair of sinusoids by driving the power level controls of the pair of sinusoids. The sinusoids output signals are summed, bandpass filtered, translated to an RF frequency, amplified, filtered via upconverter 256 and radiated by antenna 258 to complete transmission of channel data bits 210.

Computing Forward-Link Gain Upon Call Origination

Figure 3:
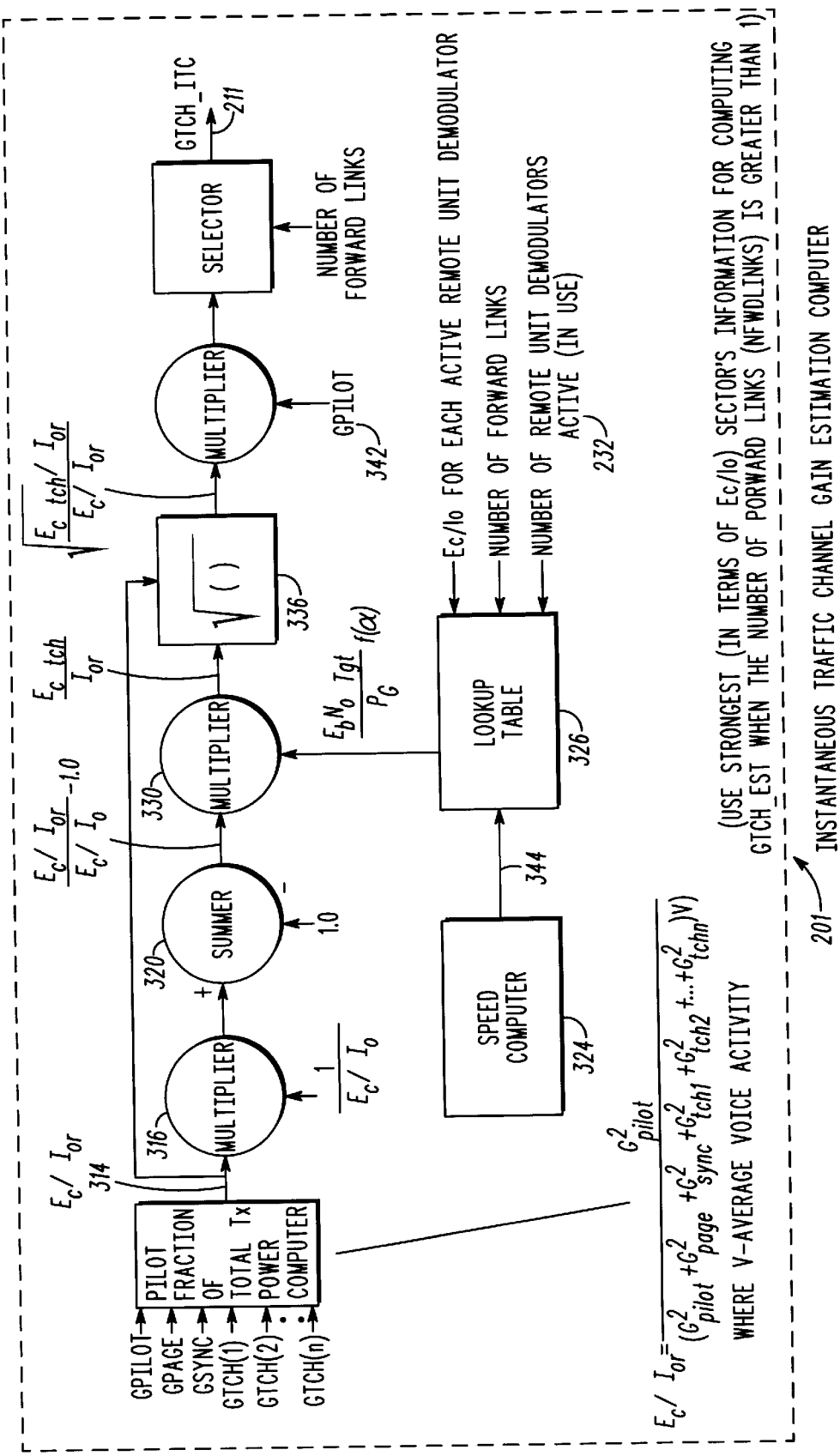
FIG. 3 is a block diagram of a preferred embodiment of an initial forward power control computer of FIG. 2.

FIG. 3 is a block diagram of a preferred embodiment of ITC 201 of FIG. 2. ITC 201 comprises pilot fraction computer 312, multiplier 316, summer 320, multiplier 330, lookup table 326, square root calculator 336, multiplier 340 and selector 310. In a preferred embodiment, instantaneous traffic channel gain estimate (Gtch_ITC) 211 is computed based on a signal quality metric such as pilot channel $E_c/I_o$ measured with respect to the serving base station. (The pilot channel is a forward link that is continuously broadcast to the remote unit that controls remote unit timing). In addition to determining Gtch_ITC 211 based on pilot channel $E_c/I_o$, forward-link gain upon call origination is additionally based on remote unit speed.

Prior to describing the operation of ITC 201, it will be beneficial to describe the relationship between Gtch_ITC 211 and three variables utilized in determining Gtch_ITC 211 (pilot $E_c/I_{or}$, pilot $E_c/I_o$, required $E_b/N_o$ for 1% Forward Error Rate (FER)). In a preferred embodiment the following equations are utilized in determining forward-link gain upon call origination:

$$\frac{E_b N_{0\_Tgt}}{P_G} = \frac{\frac{E_{c\_tch}}{I_{or}} \lambda P_{cell}(i) T_{i,k}}{\sum_{\substack{j=1 \\ j \neq i}}^{ncells} P_{cell}(j) T_{j,k} + N_{th} W + (1-\lambda) P_{cell}(i) T_{i,k}} \quad (1)$$

$$\frac{E_c}{I_o} = \frac{\frac{E_c}{I_{or}} \lambda P_{cell}(i) T_{i,k}}{\sum_{\substack{j=1 \\ j \neq i}}^{ncells} P_{cell}(j) T_{j,k} + N_{th} W + P_{cell}(i) T_{i,k}} \quad (2)$$

$$E_c/I_{or} = \frac{G_{pilot}^2}{(G_{pilot}^2 + G_{page}^2 + G_{sync}^2 + (G_{tch1}^2 + G_{tch2}^2 + \ldots + G_{tchn}^2) V)} \quad (3)$$

where

λ—fraction of total signal power recovered by demodulator $T_{i,k}$—path loss between cell i and remote unit k.

$P_{cell}(i)$—total power transmitted by cell I also represented as IorW $$\sum_{\substack{j=1 \\ j \neq i}}^{ncells} P_{cell}(j) T_{j,k}$$

interference from other (non serving) cells seen at remote unit k $N_{th}W$—AWGN noise due to receiver and/or other non-CDMA sources $E_c/I_{or}$—pilot fraction of total transmit power $$\frac{E_{c\_tch}}{I_{or}}$$

traffic channel fraction of total transmit power $E_c/I_o$—pilot fraction of total received power $I_{or}$—cell transmit power spectral density ($I_{or}W = P_{cell}(i)$)

$\hat{I}_{or}$—cell power spectral density at remote unit ($\hat{I}_{or}W = P_{cell}(i) T_{i,k}$)

$I_{oc}$—other cell power spectral density $$\left( I_{oc} W = \sum_{\substack{j=1 \\ j \neq i}}^{ncells} P_{cell}(j) T_{j,k} \right)$$

W—channel bandwidth and chip rate $P_G$—processing gain

V—average forward link voice activity factor $$\frac{E_b N_{o\_Tgt}}{P_G}$$

Equations (1) and (2) can be manipulated into the form $$\frac{E_b N_{o\_Tgt}}{P_G} = \frac{\frac{E_{c\_tch}}{I_{or}} \lambda}{\frac{I_{oc} + N_{th}}{I_{or}} + (1-\lambda)} \quad (4)$$

$$\frac{E_c}{I_o} = \frac{\frac{E_c}{I_{or}} \lambda}{\frac{I_{oc} + N_{th}}{I_{or}} + 1} . \quad (5)$$

Substitution of equation (5) into (4) and solving for $$\frac{E_{c\_tch}}{I_{or}}$$

results in $$\frac{E_{c\_tch}}{I_{or}} = \left(\frac{E_c/I_{or}}{E_c/I_o} - 1\right) \frac{E_b N_{o\_Tgt}}{P_G}, \quad (6)$$

which is utilized to compute the instantaneous traffic channel gain ($G_{tch\_}{}^{ITC}$) setting given by the equation:

$$G_{tch\_ITC} = \quad (7)$$

$$\text{MIN}(\text{MAX}(G, \text{Min}\_n\_\text{WayGain}), \text{Max}\_n\_\text{WayGain})$$

where $$G = G_{pilot} \left( \sqrt{\frac{E_{c\_tch}/I_{or}}{E_c/I_{or}}} \right) \quad (8)$$

n=number of forward links

Min_n_WayGain—minimum forward-link gain threshold value given n forward links.

Max_n_WayGain—maximum forward-link gain threshold value given n forward links.

Note that in general there is more than a single ray due to soft/softer handoff and delay spread, and equation (6) is specific to the single ray case. The typical degradation with respect to two equal rays seen for remote units for varying ray power imbalances is less than 3 dB for every 6 dB of imbalance when considering imbalances less than 12 dB. For more than two rays the degradation is about 1.5 dB for every 6 dB. A modification to equation (6) to account for multiple rays is to scale the Eb/No_Tgt (lookup Eb/No value is indexed based on speed and number of rays where rays assumed to have equal power) value by a function f(α) as shown in equation (9) below $$\frac{E_{c\_tch}}{I_{or}} = \frac{E_c/I_{or}}{E_c/I_o} \frac{E_b N_{o\_Tgt}}{P_G} f(\alpha) \quad (9)$$

where $f(\alpha) = :$ $$\begin{array}{lll} 1 & n\text{rays} & = 1 \\ 10^{(3a/6)/10} \dfrac{1}{1 + (n\text{fwdlinks} - 1)10^{-a/10}} & n\text{rays} & = 2 \\ 10^{(1.5a/6)/10} \dfrac{1}{1 + (n\text{fwdlinks} - 1)10^{-a/10}} & n\text{rays} & = 3 \end{array}$$

α=ray power imbalance in dB based on demodulator (finger) Ec/Io. In the preferred embodiment it is the Strongest finger Ec/Io (dB)—second strongest finger Ec/Io (dB)

nrays—number of active (locked and combined) mobile fingers nfwdlinks—number of forward links assigned to mobile.

In an alternate embodiment the function f(α) need not account for all of the reduced power requirement due to soft/softer handoff and can be represented by f(α)=:

$$\begin{array}{ll} 1 & n\text{rays} = 1 \\ 10^{(3a/6)/10} & n\text{rays} = 2 \\ 10^{(1.5a/6)/10} & n\text{rays} = 3 \end{array}$$

Therefore, in general the Ec_tch/Ior from equation (9) will be used to compute the traffic channel gain G in equation (8).

Operation of ITC 201 occurs as follows: Current control channel and traffic channel gains for all forward links utilized by the communication system are input into pilot fraction computer 312. Pilot fraction computer 312 utilizes the current control channel and traffic channel gains to compute the current pilot $E_c/I_{or}$ based on the above equations. The current pilot $E_c/I_{or}$ is output to multiplier 316 where it is scaled by an estimate of the current pilot $E_c/I_o$ measured at the mobile from the serving base station. The scaled $E_c/I_{or}$ is output to summer 320 where "1" is subtracted from the scaled $E_c/I_{or}$, as required in equations 6 and 9. The resulting value indicates interference caused by other base stations within the network.

Figure 4:
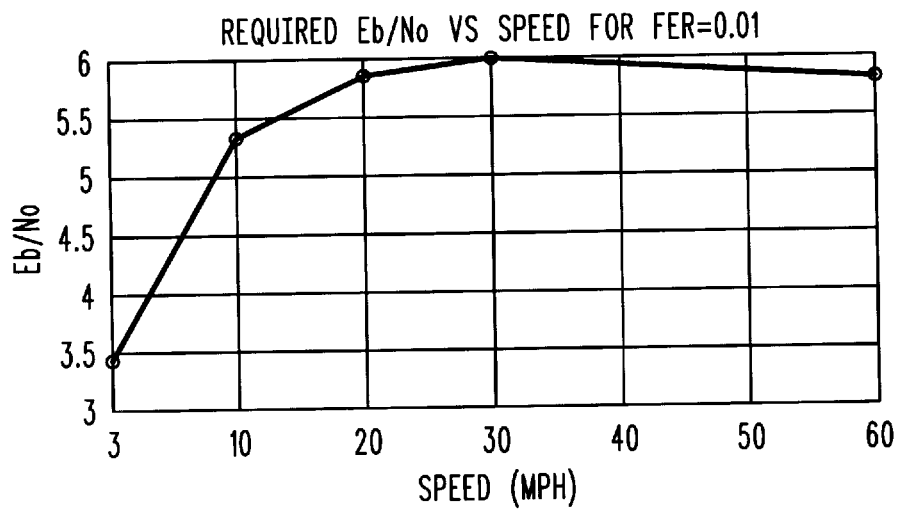
FIG. 4 illustrates a relationship between remote unit speed and $E_b/N_0$ for a 1% frame erasure rate.

Remote unit speed is determined by speed computer 324 by utilizing a single Raleigh/Rician faded ray corresponding to said remote unit from a serving base station. (Further details of determining a remote unit's speed are discussed below in reference to FIG. 5.) In a preferred embodiment of the present invention, remote unit speed estimate 344 is utilized along with the number of mobile demodulators (fingers) that are active (number of resolvable Raleigh/Rician rays used by mobile) and the Ec/Io of each of these fingers (rays) 232 to determine a required 1% FER $E_b/N_o$ target by utilizing a lookup table 326. (The required 1% FER $E_b/N_o$ target will hereinafter be refereed to as the scaled Eb/No target). Values of $E_b/N_o$ necessary to achieve 1% frame erasure rate (FER) for a 9.6 kbits/s data rate versus remote unit speed are shown in FIG. 4.

Once remote unit speed is determined, speed computer 324 provides speed index 344 to be used in conjunction with index corresponding to the number of active fingers 232 to lookup a first Eb/No target which is then scaled by the function f(α) which is a function of the ray imbalance (primary ray with respect to secondary), also determined from the ray Ec/Io information 232 (see equation 8 above) to produce scaled Eb/No target.

In a preferred embodiment, these values are stored in lookup table 326. The scaled $E_b/N_o$ value is in turn used to scale the normalized interference quantity utilizing multiplier 330 resulting in the traffic channel fraction of transmit power ($E_{c\_}{}^{tch}/I_{or}$).

Square root calculator 336 has as its input, $E_c/I_{or}$ and $E_{c\_}{}^{tch}/I_{or}$ and determines the square root of the ratio of $E_c/I_{or}$ and $E_{c\_}{}^{tch}/I_{or}$ and outputs this value to multiplier 340. A preliminary traffic channel gain is determined by multiplier 340 by multiplying the output from the square root calculator 336 by the pilot gain. The preliminary traffic channel gain is then restricted by selector 310 (as given in equation 7) to a desired operational range resulting in the initial traffic channel gain setting which output from selector 310 and used to set the traffic channel gain setting 211 (Gtch_ITC) for the initial forward traffic channel link. Computing origination forward-link gain based on pilot channel $E_c/I_o$ measured with respect to the serving base station, results in many instances where the forward-link gain is originated at a lower gain than prior-art methods. Originating forward-link gain at lower levels reduces the time a base station transmits at an unacceptably high forward-link gain.

Estimation of Remote Unit's Speed

Because there exists a relationship between the bandwidth of a faded signal received from a remote unit and a remote unit's speed, an estimation of a remote unit's speed can be determined from estimating the bandwidth of the faded signal. In a preferred embodiment, a classic fading model is used in which the mobile is driving through an infinite field of minute scatterers which results in a U-shaped power spectrum, S(f). Assuming a vertically polarized electric field:

$$S(f) = \frac{S_0}{\sqrt{1 - \left(\frac{f}{f_m}\right)^2}}$$

where $S_o$ is a constant giving the received power density within a small neighborhood of the transmit carrier frequency and $f$ is the independent frequency variable.

The corresponding correlation function of the real part (R) of the electric field ($J_o$) in delay is $$R(v, \tau) = J_o(\beta v \tau)$$

where $\beta = 2\pi/\lambda$ v=the remote unit's speed t=the independent delay variable and $$f_m = \frac{\beta v}{2\pi}.$$

Estimating $f_m$ will provide an estimate of v. The standard deviation with respect to f of S(f) is:

$$\sigma = \frac{f_m}{\sqrt{2}}.$$

If the carrier is at 900 MHz (a typical operating frequency for CDMA), then:

$\hat{v} = 1.06\sigma.$

If frequency offset, $f_O$, is present, the resulting spectrum is $S'(f) = S(f - f_o).$ One can approximate $f_O$ by estimating a mean of the two sided, generally asymmetric, spectrum. The mobile speed may be estimated by finding the second central moment (variance) of the observed power spectrum, and the frequency offset between transmitter and receiver may be obtained by estimating the first moment (mean). For example, a speed estimate is obtained by measuring the standard deviation of the remote unit's observed power spectrum. The remote unit's power spectrum is approximated by carrying out the following steps:

1.) compute the complex Fast Fourier Transform (FFT) of the data selection block (described in FIG.5).
2.) form the magnitude square of the FFT
3.) average several magnitude square FFT's
4.) set to zero, terms in the average function which are below a threshold.

If the peak of the power spectral density (PSD) is denoted $PSD_{max}$, spectral values below $PSD_{max}/3.5$ are not included in the moment calculation. The threshold will, in general, be an inverse function of the signal-to-noise ratio.

Figure 5:
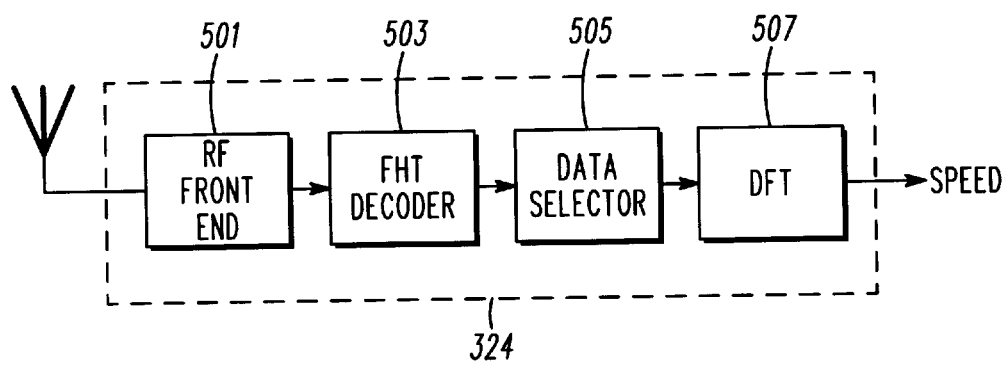
FIG. 5 is a block diagram of a preferred embodiment of a speed computer of FIG. 3.

FIG. 5 illustrates a block diagram of speed computer 324 of FIG. 3.

Speed computer 324 comprises RF front end 501, Fast Hadamard Transform (FHT) decoder 503, Data Selector 505, and discrete Fourier transformer (DFT) 507. Operation of speed computer 324 occurs as follows: A mixed, downconverted, and despread signal emerging from RF front end 501 enters FHT decoder 503 where the incoming signal is decoded. FHT data, called Walsh symbols in this context, emerge from FHT decoder 503 at a rate of 4800 Hz. At a typical operating point, about 20% of the winning Walsh indexes do not correspond to the index of the transmitted Walsh symbol, i.e., 20% of the winning Walsh indexes are wrong. FHT data enters data selector 505, and may be passed to DFT 507 as the complex FHT output corresponding to the winning index or, if side information is available telling which indices were incorrect, the corresponding soft outputs may be erased (set to 0+j0). Such side information could be made available by re-encoding frames which have a cyclic redundancy check (CRC) that passes as described in "A Method and Apparatus for Estimating a Channel Parameter in a Digital Radio Frequency Communication System" (Docket No. CEO2963R Sexton) which is incorporated by reference herein. Every group of six re-encoded bits would be the true Walsh index. A falsing event would occur at the rate at which the CRC reports a frame decoded correctly when it has actually decoded incorrectly. For a 12 bit CRC, the probability of this is roughly 0.025%. A further improvement is accomplished by saving FHT outputs with the N largest magnitudes, denoted the "very likely" set. In this case, rather than an erasure, the proper value is fetched from one of the N "very likely". If the correct index is not one of those saved, an erasure takes place. In the exhaustive case, N=64 and no erasures are necessary. Yet another variation would be to use winning Walsh symbols unless the frame fails to pass the CRC, relying on frames passing the CRC to have fewer symbols in error than others.

In a preferred embodiment, the DFT design parameters are:

1. the number of input terms in the calculation of a single DFT (2 frames, 192 symbols used here).
2. the number of frequency points in the output DFT (4*192).
3. the number of DFT's averaged before computation of means and variances (5, i.e., once per 10 input frames).
4. the time constant used to filter the offset and speed estimates obtained immediately from the mean and variance.

In an alternate embodiment a power control bit stream is utilized for calculating the remote unit's speed. At the low speed, the power control bit stream exhibits periods of a regular up/down pattern that corresponds to channel coherence time. When neither signal is faded the pattern is similar to '1111100000011111 00000.' Thus an indication of velocity can be obtained by searching for discrete components in a frequency transform of the power control bit stream. If it is determined that much of the energy is located at a few predetermined frequency groups, the remote unit's speed is low, otherwise the remote unit's speed is high. The following steps are taken in the alternate embodiment:

1. Buffer the power-control bit stream for 2 frames (32 bits).
2. When the buffer is full, compute a 32-ary Fast Hadamard Transform of the bits, treating 0's as −1's and 1's as 1's.
3. Examine the 32 outputs. If 50% of the energy is located at 8 or fewer predetermined terms, declare the speed to be less than 10 mph; otherwise declare it to be above 10 mph.

Figure 6:
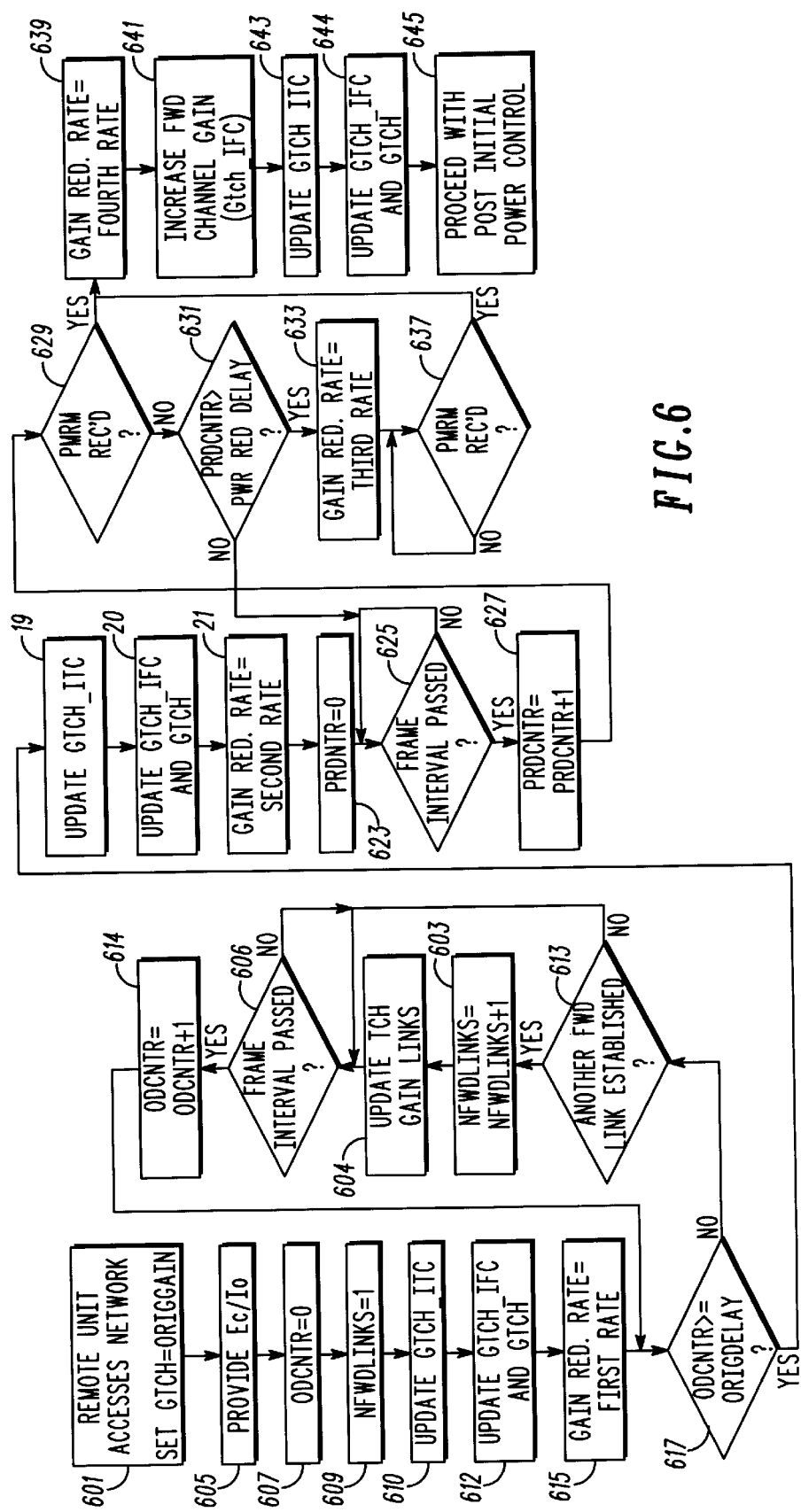
FIG. 6 is a flow chart of a preferred embodiment of operating a base station transmitter of FIG. 2 during call origination in accordance with a preferred embodiment of the present invention.

FIG. 6 is a flow chart of a preferred embodiment of operating a base station transmitter of FIG. 2 during call origination/termination (remote unit accesses the network and a forward link is assigned) to the point that it starts "normal" or post initial forward power control (point where PFC 239 takes over power control). The logic flow begins at step 601 where the remote unit accesses the communication system and a forward (TCH) link is assigned with gain equal to OrigGain (Gtch_IFC=OrigGain) by IFC 236 which is selected by switch 243 such that Gtch 244 is equal to Gtch_IFC 238. (OrigGain is the initial gain level used for the first forward TCH link assigned during call origination, discussed in reference to FIG. 3).

At step 605 the remote unit provides ITC 201 with the current $E_c/I_o$, with respect to the strongest finger measured by the remote unit. In a preferred embodiment the $E_cI_o$ is provided immediately after call setup when the remote unit sends the finger Ec/Io information via Power Measurement Report Message (PMRM) or a Pilot Strength Measurement Message (PSMM) as defined in TIA/EIA/IS95-A system protocol. In an alternate embodiment the finger Ec/Io information is included as part of the information exchanged in the call setup procedure itself. At step 607, IFC 236 initializes the origination delay counter by setting variable ODCNTR to zero, and increments ODCNTR every 20 ms (frame time duration) thereafter (step 614). At step 609 IFC 236 sets the number of forward links to "1" ($N_{fwdlinks}=1$). At step 610 ITC 201 computes a new instantaneous Gain update (Gtch_ITC) 211 based partly on the current Ec/Io obtained from step 605. At step 612 the initial forward gain (Gtch_IFC) is updated by IFC 236 to be equal to alpha*Gtch_IFC+(1alpha)*Gtch_ITC (in preferred embodiment alpha=0.5) which provides a conservative gain setting based on having only one forward TCH link to assure the acquisition of all possible forward links. (This gain is referred to as Gtch_IFC 238 in FIG. 2). At step 615 a first gain reduction rate is established by IFC 236. In a preferred embodiment, the first gain reduction rate is initially set to zero so forward-link gain does not decrease prior to all forward links being established. Initially setting the gain reduction to zero allows for a high enough forward-link gain for a period of time to assure the acquisition of all possible forward links.

Continuing, at step 617 IFC 236 determines if the origination delay counter has exceeded a threshold level. In a preferred embodiment this is accomplished by IFC 236 comparing ODCNTR to the variable OrigDelay. This determination is made to allow a minimum time (OrigDelay) for acquisition of all forward links by the remote unit. If at step 617 it is determined that ODCNTR is not greater than OrigDelay then at step 613 IFC 236 determines if another forward link has been assigned to the remote unit. This occurs when the previous serving Base Station(s) have positively responded to a handoff request corresponding to a pilot strength measurement message (PSMM) sent by the remote unit when it detects a non-serving Base Station pilot of sufficient strength. If at step 613, IFC 236 determines that another forward link has been established then $N_{fwdlinks}$ is incremented by one at step 603 and the logic flow continues to step 604. If at step 613, IFC 236 determines that another forward link has not been established, then the logic flow continues to step 604.

In a preferred embodiment, maximum and minimum forward-link gain threshold values (Max_n_WayGain, Min_n_WayGain, where "n" is the number of forward links assigned to remote unit due to soft/softer handoff) are determined based on the number of forward links. Due to the diversity benefit of soft hand off reducing the degradation caused by additional interference, Max_n_WayGain and Min_n_WayGain decrease as more forward links are established. At step 604 the maximum and minimum forward-link gain threshold values are determined based on the number of forward links. In the preferred embodiment, the maximum and minimum forward-link gain threshold values are set as follows:

$$Min\_1\_WayGain = \sqrt{0.025} \ G_{pilot}$$

$$Max\_1\_WayGain = \sqrt{0.5} \ G_{pilot}$$

$$Min\_2\_WayGain = \sqrt{0.025} \ G_{pilot}$$

$$Max\_2\_WayGain = \sqrt{0.4} \ G_{pilot}$$

$$Min\_3\_WayGain = \sqrt{0.025} \ G_{pilot}$$

$$Max\_3\_WayGain = \sqrt{0.3} \ G_{pilot}$$

Continuing, if at step 606 the current frame interval has passed then the logic flow continues to step 614 else it returns to step 606. At step 614 ODCNTR is incremented and the logic flow continues to step 617. If at step 617 it is determined that ODCNTR is greater than or equal to OrigDelay then the logic flow continues to step 619. If NFWDLINKS>1 then at step 619 ITC 201 computes new instantaneous Gain update (Gtch_ITC) 211 based partly on the forward link Ec/Io information obtained from the PSMM messages received from step 613 and 603. At step 620 the forward gain (Gtch_IFC) is updated by IFC 236 and set equal to alpha*Gtch_IFC+(1-alpha)*Gtch_ITC (in preferred embodiment alpha=0.5). Each forward (TCH) link is assigned the gain selected by switch 243 such that Gtch 244 is equal to Gtch_IFC 238.

Continuing, at step 621 the gain reduction rate is changed to a second rate in order to begin decaying the forward gain. In the preferred embodiment, the forward gain is decayed at a rate of 1 gain unit every 20 frame (20 ms) interval. Next at step 623 the power reduction delay counter ($PRDC_{ntr}$) is initialized (set to zero). In a preferred embodiment the power reduction delay counter determines the number of frames transmitted from the remote unit. The value of $PRDC_{ntr}$ is utilized in order to determine the number of frames transmitted by the remote unit between Power Measurement Report Messages (PMRMs). In a preferred embodiment, the remote unit reports a PMRM when 2 frame errors are detected by the remote unit. PMRMs specify the number of frame errors a remote unit experiences, and as described in EIA/TIA/IS-95-A, a remote unit can be directed to generate a PMRM periodically and/or when an error threshold is reached. Determining the number of frame errors that occur within a given number of frames gives an indication of the forward link FER. For example, assuming the mean number of frames between erasures is 83, an FER of 1/83=.012 or 1.2% exists.

Continuing, at step 625 IFC 236 determines if a frame interval has passed, and if not, the logic flow returns to step 625. If at step 625 it is determined that a frame interval has passed, then at step 627 $PRDC_{ntr}$ is incremented by one and the logic flow continues to step 629 where IFC 236 determines if a PMRM has been received. If at step 629 it is determined that a PMRM has not been received then the logic flow continue to step 631. At step 631, IFC 236 compares $PRDC_{ntr}$ to a threshold ($P_{wr}R_{ed}D_{elay}$). If at step 631 $PRDC_{ntr}$ is greater than $P_{wr}R_{ed}D_{elay}$, then the number of frames without a PMRM has exceeded a threshold and at step 633 the gain reduction rate is increased to a third rate. In a preferred embodiment, the gain reduction rate is increased to 1 gain unit every 10 frames. If at step 631 $PRDC_{ntr}$ is not greater than $P_{wr}R_{ed}D_{elay}$, then the logic flow returns to step 625.

At step 637 IFC 236 waits for a PMRM to occur by determining if a PMRM has been received, and if not, returning to step 637. If at step 637 IFC 236 determines that a PMRM has been received, then the logic flow continues to step 639. Returning to step 629, if at step 629 it is determined that a PMRM has been received then the logic flow continues to step 639 where the gain reduction rate is decreased to a 4th rate. In the preferred embodiment, the gain reduction rate is decreased to 1 gain unit every 20 frames. At step 641 IFC 236 increases the forward-link gain. In the preferred embodiment the forward-link gain (Gtch_IFC) is increased by 20 gain units. At step 643 ITC 201 computes new instantaneous Gain update (Gtch_ITC) 211 based partly on the current remote unit Ec/Io information obtained from the PMRM message.

Continuing to step 644, the forward gain (Gtch_IFC) is updated by IFC 236 equal to alpha*Gtch_IFC+(1-alpha)*Gtch_ITC (in preferred embodiment alpha=0.5). Each forward (TCH) link is assigned the gain selected by switch 243 such that Gtch 244 is equal to Gtch_IFC 238. The logic flow continues to step 645 where IFC 236 hands power control to PFC 239 to proceed with post-initial power control.

Computing Forward-Link Gain After Call Origination

Figure 7:
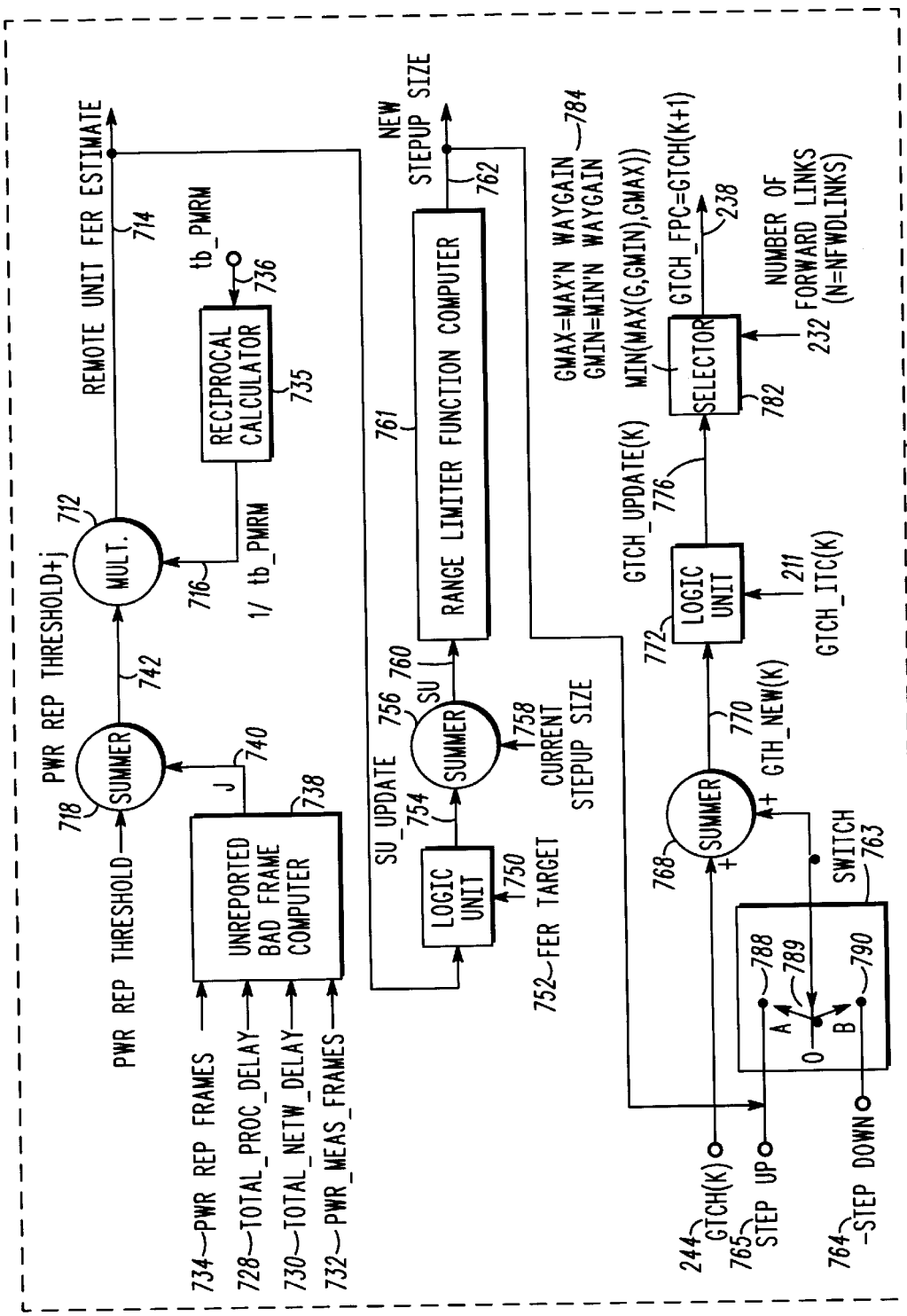
FIG. 7 is a block diagram of a preferred embodiment of a post-origination forward power control computer of FIG. 2.

FIG. 7 is a block diagram of a preferred embodiment of PFC 239 of FIG. 2. PFC 239 comprises unreported bad frame computer 738, summer 718, multiplier 712, reciprocal calculator 735, logic unit 750, summer 756, range limiter function computer 761, switch 763, summer 768, second logic unit 772, and selector 782.

Operation of PFC 239 occurs as follows: PwrRepThresh setting 710 is summed with the estimate of the number of unreported bad frames (j) 740 by summer 718. PwrRepThresh 710 represents a threshold to which the mobile compares the number of bad frames received in a window with length PwrRepFrames 734 frames before sending a PMRM message. Unreported bad frame computer 738 uses as inputs total processing delay 728, total network delay 730, PWR_MEAS_FRAMES value 732 returned in the PMRM, and PwrRepFrames 734 values to estimate the number of unreported bad frames (j) 740 based on the following equations, $$k=tb\_PMRM-Total\_Processing\_delay-Total\_Network\_delay-PWR\_MEAS\_FRAMES$$

$$j=integer[k/PwrRepFrames]*(PwrRepThresh-1)/m1+(Total\_Processing\_delay+Total\_Network\_delay)/m2$$

where
m1 and m2 values are a function of rate of decrease of the TCH power level and step up size. Typical values used are m1=2, m2=3.

PwrRepThresh 710 and PwrRepFrames 734 values are known at every base station. (Note if the PMRM is set to periodic mode then the ERRORS_DETECTED field in the PMRM should be used instead of PwrRepThresh 710).

As stated, unreported bad frame computer 738 estimates the number of bad frames that are not reported (j) 740 in the PMRM for the time interval of interest. The value j 740 is added to the bad frame PMRM threshold value PwrRepThresh 710 using summer 718 to produce the total estimated bad frame count 742 at the remote unit in the time interval given by tb_PMRM. Each Base station keeps track of the time between PMRMs using counter tb_PMRM 736 for each forward link. Tb_PMRM counter 736 is reset each time the new forward TCH gain is set due to receiving a PMRM. Quantity 742 is scaled using the multiplier 712 by reciprocal of tb_PMRM 716 resulting in Remote Unit FER Estimate 714.

Reciprocal of tb_PMRM 716 is obtained by applying reciprocal calculator 735 to tb_PMRM 736.

An alternative embodiment to computing the Remote Unit FER Estimate 714 consists of utilizing the value given in ERRORS_DETECTED field of the PMRM which indicates the number of frame erasures the mobile detected in the time interval given in terms of 20 ms frames found in the PWR_MEAS_FRAMES field of the PMRM. ERRORS_DETECTED value is scaled by reciprocal of the PWR_MEAS_FRAMES value 732 using multiplier resulting in remote unit FER estimate.

Continuing, remote Unit FER estimate 714 and FER target 752 are applied to logic unit 750 where a step size update value (su_update) 754 is determined by equation $$su\_update=f(FER\_Target-Remote\_Unit\_FER\_estimate),$$

where in one embodiment f() is given as $$err=FER\_Target-Remote\_Unit\_FER\_estimate$$

if(err>thresh)
  su_update=k1
else if(err<thresh2)
  su_update=k2.

Su_update value 754 is added to current step up size 758 using summer 756 resulting in SU 760. This value is limited to a specified minimum (StepUpMinSize) and maximum (StepUpMaxSize) step up size by range limiter function 761 resulting in new StepUp Size 762. New StepUp Size 762 is selected by switch 763 if a PMRM was received and is added to current gain setting 244 by summer 768 to produce updated traffic channel gain 770. If a PMRM has not been received and Deltatime frames (in preferred embodiment Deltatime is set to 25) has elapsed since the last step down then switch 763 is connected to point 790 and a StepDown value is applied to current traffic channel gain 244 via summer 768 to produce new traffic channel gain 770. If a PMRM has not been received and Deltatime frame has not elapsed since the last step down then switch 763 is set to position 789 resulting in Gtch_new 770 being set to Gtch 244. If a PMRM or a PSMM has been received, logic unit 772 computes updated traffic channel gain update 776 by weighting and summing the instantaneous gain setting Gtch_ITC 211 computed by ITC 201 with new traffic channel gain 770 based on equations $$Gtch\_update(k)=alpha*Gtch\_new(k)+beta*Gtch\_ITC(k)$$

(In a preferred embodiment alpha=0.9 and beta=0.1).

Selector 782 limits the gain to be in the range (Gmin=Min'n'WayGain,Gmax=Max'n'WayGain)) resulting in PFC gain value 238 (Gtch(k+1)) which is selected by switch 243 as described in reference to FIG. 2.

In an alternate embodiment of the present invention, instead of changing the StepDown/StepUp value of the current gain setting (Gtch_FPC), the StepDown/StepUp values are allowed to remain the same, but the time between stepping down or stepping up Gtch_FPC is allowed to vary. For example, in an alternate embodiment logic unit 750, summer 758, and range limiter function computer 761 function as follows. Upon reception of a PMRM, remote unit FER estimate 714 is computed as shown in FIG. 7. Estimate 714 and FER target 752 are used by logic unit 750 to compute a deltatime update based on $$dt\_update=g(Remote\_Unit\_FER\_estimate-FER\_Target).$$

where in one embodiment go is given as err=FER_Target−Remote_Unit_FER_estimate
if(err>thresh)
    dt_update=k1
else if(err<thresh2)
    dt_update=k2

The Dt_update value is added to current Deltatime size using summer 756. This value is limited to a specified minimum (DeltatimeMinSize) and maximum (DeltatimeMaxSize) Deltatime size by range limiter function 761, resulting in a new Deltatime Size. The New Deltatime Size is used to periodically reduce the traffic channel gain setting using a fixed step down size. (The step up size is also fixed). If a PMRM has not been received and Deltatime frames has elapsed since the last step down then switch 763 is connected to point 790 and a StepDown value is applied to current traffic channel gain 244 via summer 768 to produce new traffic channel gain 770. StepUp value 765 is selected by switch 763 if a PMRM was received and is added to current gain setting 244 by summer 768 to produce updated traffic channel gain 770. If a PMRM has not been received and Deltatime frame has not elapsed since the last step down then switch 763 is set to position 789 resulting in Gtch_new 770 being set to Gtch 244. If a PMRM or PSMM has not been received and Deltatime frames have elapsed since last step down then switch 763 is connected to point 790 and a StepDown value is applied to current traffic channel gain 244 via summer 768 to produce new traffic channel gain 770. Logic Unit 772 computes updated traffic channel gain update 776 by weighting and summing the instantaneous gain setting Gtch_ITC 211 computed by ITC 201 with new traffic channel gain 770 based on equations Gtch_update(k)=alpha*Gtch_new(k)+beta*Gtch_ITC(k) (in a preferred embodiment alpha=0.9 and beta=0.1)

Selector 782 limits the gain to be in the range (Gmin=Min'n'WayGain,Gmax=Max'n'WayGain)) resulting in PFC gain value 238 (Gtch(k+1)) which is selected by switch 243 as shown in FIG. 2.

Note that in both embodiments the traffic channel gain can be updated when a PSMM is received based on the pilot Ec/Io information contained in the message. In this case the instantaneous gain setting Gtch_ITC is computed by ITC 201 and is used to update the current gain setting via Gtch_update(k)=alpha*Gtch_new(k)+beta*Gtch_ITC(k) (in a preferred embodiment alpha=0.9 and beta=0.1).

Figure 8:
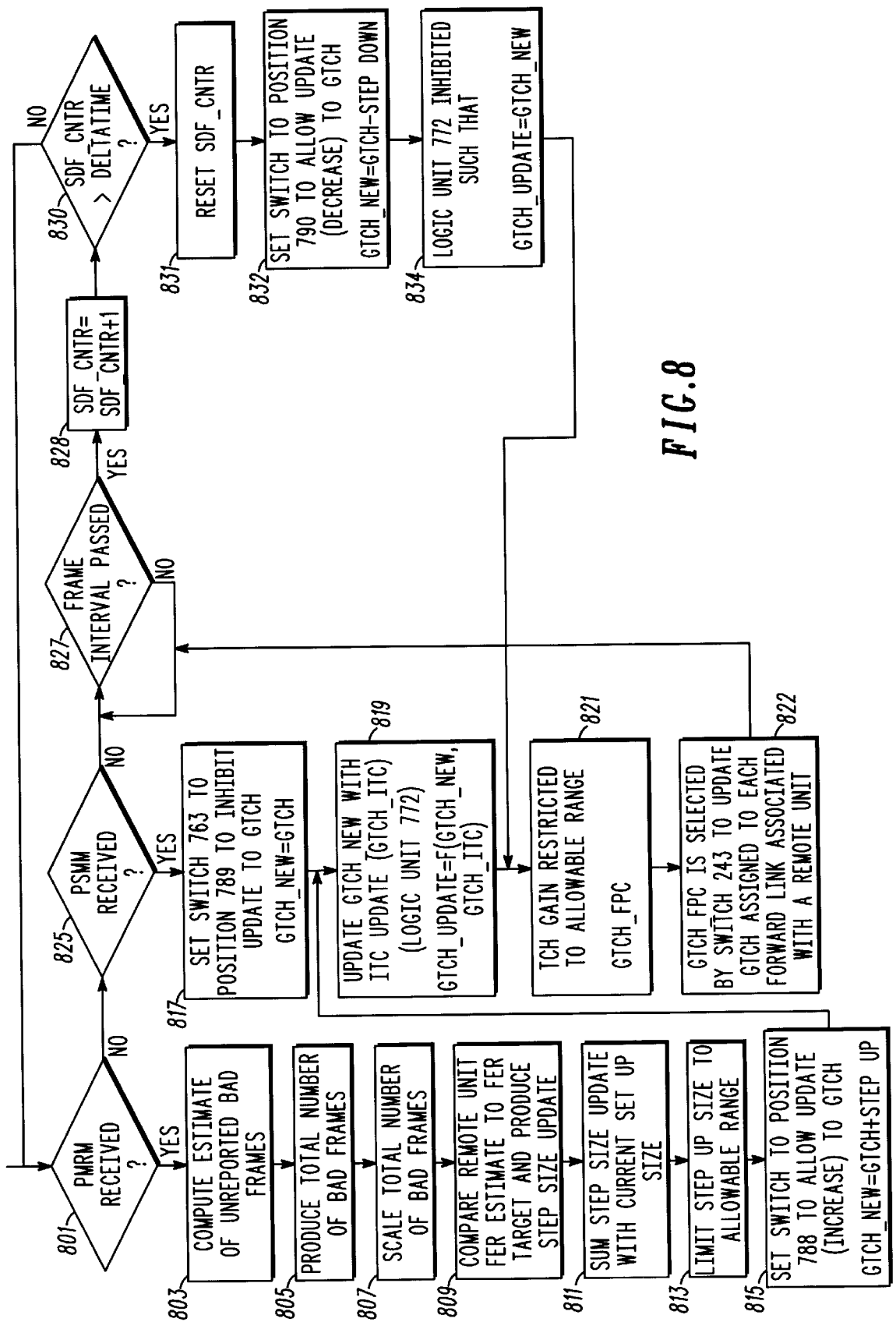
FIG. 8 is a flow chart of a preferred embodiment of operating a post-origination forward power control computer of FIG. 2.

FIG. 8 is a flow chart of a preferred embodiment of operating a base station transmitter of FIG. 2 during post initial forward power control. The logic flow begins at step 801 where it is determined if a PMRM has been received. If at step 801, a PMRM has been received the flow continues to step 803 else it proceeds to step 825 where a decision to proceed to step 817 is made if a PSMM was received else the flow moves to step 827. At step 803 the unreported bad frame computer 738 computes an estimate of the number of unreported bad frames (j) 740. At step 805 the number of bad frames detected at the mobile (either PwrRepThresh or ERRORS_DETECTED from the PMRM message itself) is summed with (j) 740 to produce an estimate of the total number of bad frames 742. At step 807 the total number of bad frames 742 is scaled by 1/tb_PMRM 716 using multiplier 712 to produce Remote Unit FER Estimate 714. At step 809 Remote Unit FER Estimate 714 is compared to FER Target 752 by logic unit 750, which produces step size update 754.

Next, at step 811, the step size update is summed with the current StepUp size 758 to produce new step update size (SU) 760. Step update size 760 is then limited by range limiter function 761 (step 813) resulting in new StepUp Size 762. At step 815, switch 763 is set to position 788 and the StepUp size is applied to summer 768 to be added to Gtch 244 to produce new traffic channel gain 770 (Gtch_new). At step 819 new traffic channel gain 770 and the instantaneous traffic channel gain 211 (Gtch_ITC) are used by logic unit 772 to compute an updated traffic channel gain 776 (Gtch_update). At step 821 selector function 782 restricts the allowable gain value, resulting in gain Gtch_PFC 241 and the logic flow continues to step 823. At step 823 each forward (TCH) link associated with a given remote unit is assigned gain Gtch_PFC 241 selected by switch 243 such that Gtch 244 is equal to Gtch_PFC 241. The logic flow continues to step 827.

At step 827 the flow pauses until the current frame interval has passed after which the logic flow continues to step 828 where the step down frame counter SDF_CNTR is incremented. The logic flow continues to step 830 where the frame counter SDF_CNTR is compared to Deltatime. If at step 830 it is determined that SDF_CNTR exceeds Deltatime then the logic flow continues to step 831 where SDF_CNTR is reset to 0, otherwise the logic flow returns to step 801. Continuing, at step 832 switch 763 is set to position 790 such that the TCH gain is decreased Gtch_new=Gtch-StepDown . Next at step 834 the logic unit 772 is inhibited such that Gtch_update 776 is set equal to Gtch_new 770. The logic flow then returns to step 821 where selector function 782 restricts the allowable gain value, resulting in gain Gtch_PFC 241. At step 823 each forward (TCH) link associated with a given remote unit is assigned gain Gtch_PFC 241 selected by switch 243 such that Gtch 244 is equal to Gtch_PFC 241.

FIG. 9 illustrates a time-domain diagram of forward-link gain control applied in accordance with a preferred embodiment of the invention. The top graph in FIG. 9 illustrates the improvement in reduced transmit power level due to the lower gain levels achieved with the initial power control algorithm and the post-initial power control algorithm. At time t=1 the TCH gain is reduced from OrigGain to Gtch_init based on the pilot Ec/Io information obtained from the remote unit for the initial forward link based on ITC 201 estimate. At time t=2 the traffic channel gain is reduced again based on pilot Ec/Io information for each of the forward links returned via PSMM messages by the remote unit as it transitioned to different handoff states (added forward links). A second rate of gain reduction is also chosen, as indicated by the increase in slope of Gtch. At time t=3 no PMRM has been received in PwrRedDelay frames hence a steeper rate of decay (3rd rate) is applied to Gtch for each forward link. At time t=5 a PMRM is received an after the gain is increased it is updated using the pilot information obtained in the PMRM. The normal (post-initial) power control proceeds with the next received PMRM. The bottom graph in FIG. 9 illustrates the adjusted step-up size post-initial power control approach with the same flow of events as those described in the top graph. As is evident in both FIG. 9a and FIG. 9b, the amount of time that a base station can transmit at an unacceptably high forward-link gain for extended periods of time is reduced when compared to the prior art approach. By reducing the time a base station transmits at an unacceptably high forward-link gain, system noise is reduced.

The invention, in its broader aspects, is not limited to the specific details, representative apparatus, and illustrative examples shown and described above. Various modifications and variations can be made to the above specification without departing from the scope or spirit of the present invention. For example although the above description describes power control within a spread-spectrum system this method of power control can be employed within any communication system (Personal Communication Systems for example). It is intended that the present invention cover all such modifications and variations provided they come within the scope of the following claims and their equivalents.

What is claimed is:

1. A method of power control in a communication system, the method comprising the steps of:

communicating, via a first base station, to a remote unit on a first channel at a first power level;

determining a signal quality metric of the first channel, wherein the signal quality metric is based on a ratio of the first channel power to that of a total received power and additionally based on a number of active rays to the remote unit generated by a plurality of base stations due to soft/softer handoff; and originating a call, via the first base station, on a second channel at a second power level, said second power level different from said first power level and based on the signal quality metric.

2. The method of claim 1 wherein the step of communicating to the remote unit on the first channel comprises the step of communicating to the remote unit on a pilot channel.

3. The method of claim 1 wherein the step of communicating to the remote unit on the second channel comprises the step of communicating to the remote unit on a traffic channel.

4. The method of claim 1 further comprising the step of determining a remote unit speed and determining the signal quality metric based on the first channel Ec/Io and the remote unit speed.

5. The method of claim 1 wherein the communication system is a spread-spectrum communication system.

6. A method of power control in a communication system, the method comprising the steps of:

transmitting from cellular infrastructure equipment to a remote unit at a first power level;

receiving, by the cellular infrastructure equipment, one of a Power Measurement Report Message (PMRM) or a pilot Strength Measurement Message (PSMM) to produce a received message;

determining, at the cellular infrastructure equipment from the received message, a signal quality metric existing at the remote unit wherein said signal quality metric is based on a ratio of the first power to that of a total received power, and additionally based on a number of active rays to the remote unit generated by a plurality of base stations due to soft/softer handoff; and transmitting from the cellular infrastructure equipment to the remote unit at a second power level, said second power level based on the step of determining.

7. The method of claim 6 wherein the steps of transmitting comprises the transmitting to the remote unit on a traffic channel.

8. The method of claim 6 wherein said signal quality metric is additionally based on a time between the received PMRM.

9. The method of claim 8 wherein the signal quality metric is further based on a estimation of unreported bad frames.

10. The method of claim 6 wherein the communication system is a spread-spectrum communication system.

11. The method of claim 6 wherein the signal quality metric is derived from Ec/Io information from all active demodulators.

12. The method of claim 6 further comprising the step of adjusting a gain reduction rate based on the signal quality metric.

13. The method of claim 6 further comprising the step of adjusting a gain step up size based on the frame quality metric.

14. An apparatus for power control in a communication system, the apparatus comprising:

cellular infrastructure equipment communicating, via a first base station, to a remote unit on a first channel at a first power level; and an instantaneous traffic channel gain estimation computer (ITC) coupled to the cellular infrastructure equipment, said ITC determining a signal quality metric of the first channel wherein the signal quality metric is based on a ratio of the first channel power to that of a total received power and additionally based on a number of active rays to the remote unit generated by a plurality of base stations due to soft/softer handoff, and originating a call, via the first base station, on a second channel at a second power level, said second power level different from said first power level and based on the signal quality metric.

15. An apparatus for power control in a communication system, the apparatus comprising:

cellular infrastructure equipment transmitting from cellular infrastructure equipment to a remote unit at a first power level, said cellular infrastructure equipment receiving one of a Power Measurement Report Message (PMRM) or a Pilot Strength Measurement Message (PSMM) to produce a received message; and a post-initial forward power control computer (PFC) coupled to the cellular infrastructure equipment, said PFC determining from the received message, a signal quality metric existing at the remote unit wherein said signal quality metric is based on a ratio of the first power level to that of a total received power and additionally based on a number of active rays to the remote unit generated by a plurality of base stations due to soft/softer handoff and transmitting to the remote unit at a second power level, said second power level based on the determination.

* * * * *